US009484017B2

(12) United States Patent
Sumita et al.

(10) Patent No.: US 9,484,017 B2
(45) Date of Patent: Nov. 1, 2016

(54) SPEECH TRANSLATION APPARATUS, SPEECH TRANSLATION METHOD, AND NON-TRANSITORY COMPUTER READABLE MEDIUM THEREOF

(71) Applicant: KABUSHIKI KAISHA TOSHIBA, Minato-ku, Tokyo (JP)

(72) Inventors: Kazuo Sumita, Kanagawa-ken (JP); Akinori Kawamura, Tokyo (JP); Satoshi Kamatani, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 82 days.

(21) Appl. No.: 14/484,494

(22) Filed: Sep. 12, 2014

(65) Prior Publication Data

US 2015/0081271 A1 Mar. 19, 2015

(30) Foreign Application Priority Data

Sep. 18, 2013 (JP) ................. 2013-192550

(51) Int. Cl.
| | |
|---|---|
| *G06F 17/28* | (2006.01) |
| *G10L 15/00* | (2013.01) |
| *G10L 15/22* | (2006.01) |
| *G10L 13/00* | (2006.01) |
| *G10L 15/30* | (2013.01) |

(52) U.S. Cl.
CPC ............ *G10L 15/00* (2013.01); *G10L 15/22* (2013.01); *G10L 13/00* (2013.01); *G10L 15/30* (2013.01)

(58) Field of Classification Search
CPC ............ G10L 17/28; G10L 17/2809; G10L 17/2836; G10L 17/2854; G10L 17/2863; G10L 17/2872; G10L 17/2881; G10L 17/289; G10L 15/00; G10L 15/005; G10L 15/08; G10L 15/22; G10L 15/26; G10L 2015/00; G10L 2015/22; G10L 2015/228
USPC ............... 704/2, 5, 270, 270.1, 277, 278
See application file for complete search history.

(56) References Cited

U.S. PATENT DOCUMENTS

| | | | |
|---|---|---|---|
| 8,078,449 B2 | 12/2011 | Nagao | |
| 8,239,207 B2* | 8/2012 | Seligman | ............ G06F 17/2755 704/277 |
| 8,275,603 B2 | 9/2012 | Furihata et al. | |

(Continued)

FOREIGN PATENT DOCUMENTS

| | | |
|---|---|---|
| JP | 04-319769 | 11/1992 |
| JP | 2001-222531 | 8/2001 |

(Continued)

*Primary Examiner* — Qi Han
(74) *Attorney, Agent, or Firm* — Amin,Turocy & Watson LLP

(57) ABSTRACT

A first speech processing device includes a first speech input unit and a first speech output unit. A second speech processing device includes a second speech input unit and a second speech output unit. In a server therebetween, a speech of a first language sent from the first speech input unit is recognized. The speech recognition result is translated into a second language. The translation result is back translated into the first language. A first speech synthesis signal of the back translation result is sent to the first speech output unit. A second speech synthesis signal of the translation result is sent to the second speech output unit. Duration of the second speech synthesis signal or the first speech synthesis signal is measured. The first speech synthesis signal and the second speech synthesis signal are outputted by synchronizing a start time and an end time thereof, based on the duration.

11 Claims, 15 Drawing Sheets

(56) References Cited

U.S. PATENT DOCUMENTS

2002/0161578 A1* 10/2002 Saindon ............... G10L 15/26
  704/235
2008/0091407 A1* 4/2008 Furihata ............. G06F 17/2827
  704/4
2014/0337007 A1* 11/2014 Waibel ................ G06F 17/289
  704/3

FOREIGN PATENT DOCUMENTS

| JP | 2002-027039 | 1/2002 |
| JP | 2002-123282 | 4/2002 |
| JP | 2008-083376 | 4/2008 |
| JP | 4481972 | 3/2010 |
| JP | 2013-164515 | 8/2013 |

* cited by examiner

SPEECH TRANSLATION APPARATUS, SPEECH TRANSLATION METHOD, AND NON-TRANSITORY COMPUTER READABLE MEDIUM THEREOF

CROSS-REFERENCE TO RELATED APPLICATION

This application is based upon and claims the benefit of priority from Japanese Patent Application No. 2013-192550, filed on Sep. 18, 2013; the entire contents of which are incorporated herein by reference.

FIELD

Embodiments described herein relate generally to a speech translation apparatus, a speech translation method, and a non-transitory computer readable medium thereof.

BACKGROUND

Recently, with globalization of culture and economy, a speech translation apparatus to support communication among persons having different native languages is highly expected. For example, speech translation-application software operated with smart phone is commercialized. Furthermore, a service to present speech translation-function is used.

In these application software and service, when a user utters a speech of first language in a short unit (one sentence or several sentences) toward the speech translation apparatus, this speech is converted to a character string corresponding thereto by a speech recognition function. Furthermore, this character string of a first language (source language) is translated into a character string of a second language (target language). Last, this character string as a translation result is read aloud with speech of the second language by a speech synthesis function. Here, a user having the first language (source language) is required to utter in a short unit. On the other hand, a user having the second language (target language) is required to confirm the translation result in the short unit and to hear the synthesized speech. Accordingly, in conversation using such application software, wait time is frequently occurred. As a result, conversation with high responsiveness is hard to be performed.

Furthermore, as to the user, without restriction to request to utter in one sentence, content of conversation is desired to be communicated to the other party. However, such function is not provided yet.

Furthermore, in speech recognition or speech synthesis, physical signal of speech (such as speech input and speech output) is processed. Accordingly, a physical duration of speech becomes restriction of processing time. This restriction is regarded as a reason to delay responsiveness of interaction in conversation via the speech translation apparatus.

FIG. 14 shows a time relationship between the user's utterance (into the speech translation apparatus) and a speech output of the translation result therefrom, after conventional speech input is completed.

In FIG. 14, a horizontal axis represents a time transition. While a user A is uttering with the first language (t0~t1), this speech is captured (S900). After timing when the utterance is completed, the speech recognition result is fixed and outputted (S910). This speech recognition result is inputted and translated into the second language understandable for a user B (S920). This machine translation result is inputted and synthesized as a speech of the second language (S930). At timing (t2) when the speech synthesis result is obtained, the synthesized speech is started to be outputted to the user B, and machine translated speech is outputted (S940). Accordingly, while the user A is uttering (t0~t1), the speech is not outputted to the user B from the speech translation apparatus. At time t2, the user B can hear the translation result for the first time.

On the other hand, while the speech is being outputted to the user B (t2~t3), a speech is not outputted to the user A from the speech translation apparatus. This operation hinders conversation between users mutually located at a remote place unable to directly hear respective speeches. For example, when the user B utters during the user A is uttering, or when the user A utters during the speech is being outputted to the user B, collision is occurred in their speeches.

On the other hand, in order to confirm whether the machine translation is correctly performed, a speech translation system to back translate the machine translation result is proposed in JPA (Kokai) PH04-319769. In this reference, after the user A's speech input (the first language) is recognized, this recognition result is translated into the second language by machine translation function. This machine translation result is back translated into the first language, and the user A confirms whether this back translation result is correct or not. After this confirmation, a synthesized speech of this machine translation result is outputted to the user B. However, in this reference, each step (speech input, machine translation, back translation, speech synthesis) is executed in order. Accordingly, a wait time occurs whenever each step is executed. As a result, speech dialog cannot be smoothly performed between users.

DETAILED DESCRIPTION

According to one embodiment, a speech translation apparatus includes a first speech processing device, a second speech processing device, and a server. The first speech processing device includes a first speech input unit to capture a speech of a first language, and a first speech output unit to output another speech of the first language. The second speech processing device includes a second speech input unit to capture a speech of a second language, and a second speech output unit to output another speech of the second language. The server executes speech-translation between the first speech processing device and the second speech processing device. The server includes a speech recognition unit, a first machine translation unit, a second machine translation unit, a first speech synthesis unit, a second speech synthesis unit, and a duration measurement unit. The speech recognition unit is configured to recognize the speech of the first language sent from the first speech input unit. The first machine translation unit is configured to translate a speech recognition result of the first language outputted from the speech recognition unit into the second language. The second machine translation unit is configured to back translate a translation result of the second language outputted from the first machine translation unit into the first language. The first speech synthesis unit is configured to generate a first speech synthesis signal of a back translation result outputted from the second machine translation unit, and to send the first speech synthesis signal to the first speech output unit to output the other speech of the first language. The second speech synthesis unit is configured to generate a second speech synthesis signal of the translation result outputted from the first machine translation unit, and to send the second speech synthesis signal to the second speech output unit to output the other speech of the second language. The duration measurement unit is configured to measure a duration of the second speech synthesis signal or a duration of the first speech synthesis signal. The other speech of the first language and the other speech of the second language are outputted by synchronizing a start time and an end time of the other speech of the first language with a start time and an end time of the other speech of the second language respectively, based on the duration.

Various embodiments will be described hereinafter with reference to the accompanying drawings.

Figure 1:
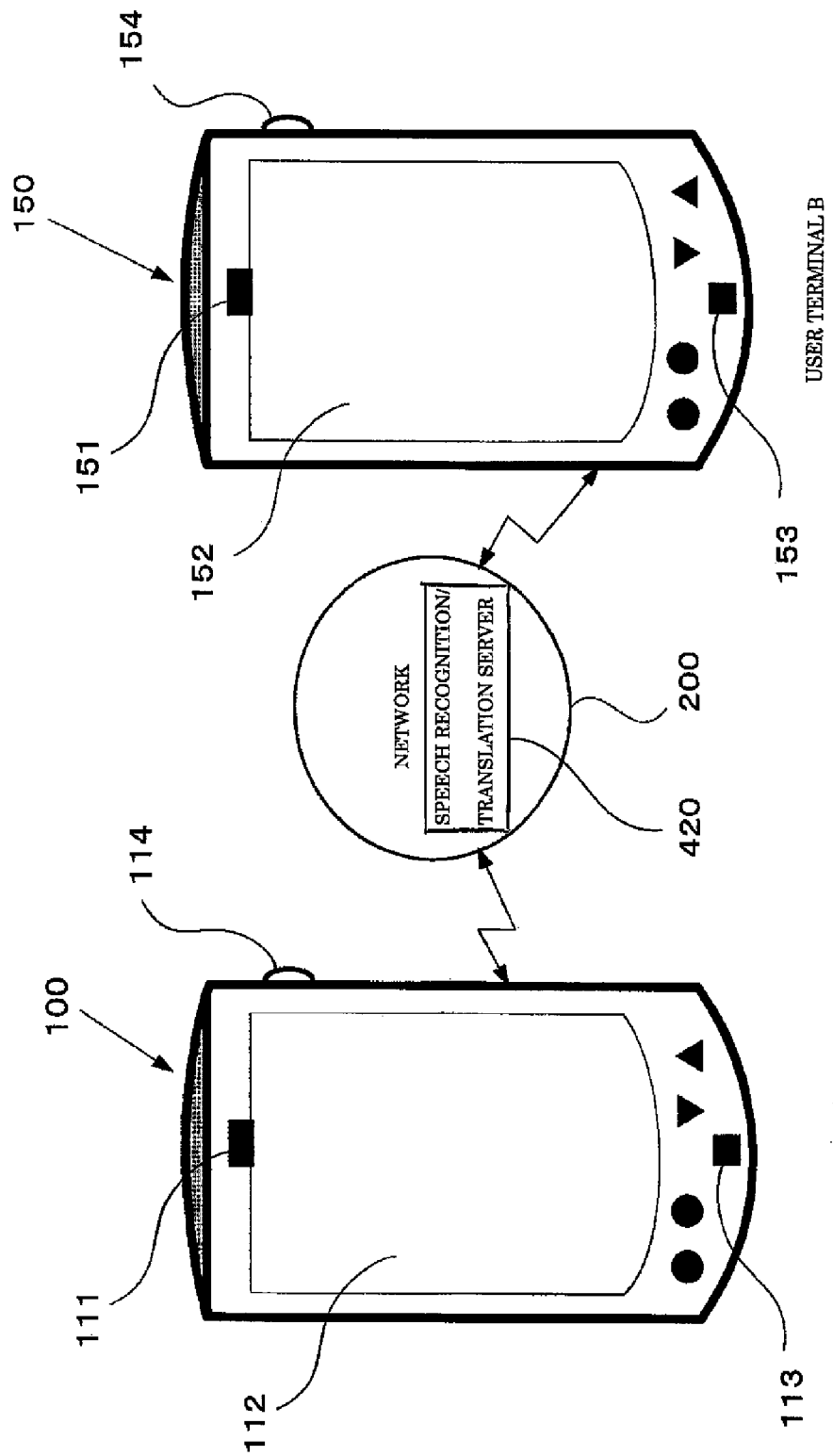
FIG. 1 is one example of hardware component of a speech translation apparatus.

FIG. 1 is entire component of a speech translation apparatus according to various embodiments. A user terminal A (100) is a first speech processing device. The user terminal A (100) is a portable housing including a speaker 111, a display 112, a microphone 113, and a speech input button 114. In the same way, a user terminal B (150) is a second speech processing device. The user terminal B (150) is a portable housing including a speaker 151, a display 152, a microphone 153, and a speech input button 154. The speakers 111 and 151 output a machine translation result and a back translation result by speech. The displays 112 and 152 display a speech recognition result, the machine translation result and the back translation result. The microphones 113 and 153 capture user's utterance. The speech input buttons 114 and 154 indicate to start to capture the utterance.

The user terminal A (100) and the user terminal B (150) are connected via a speech recognition/translation server 420 on a network 200. By above-mentioned component, a speech translation system by a portable electronic device such as a smart phone is provided.

Figure 2:
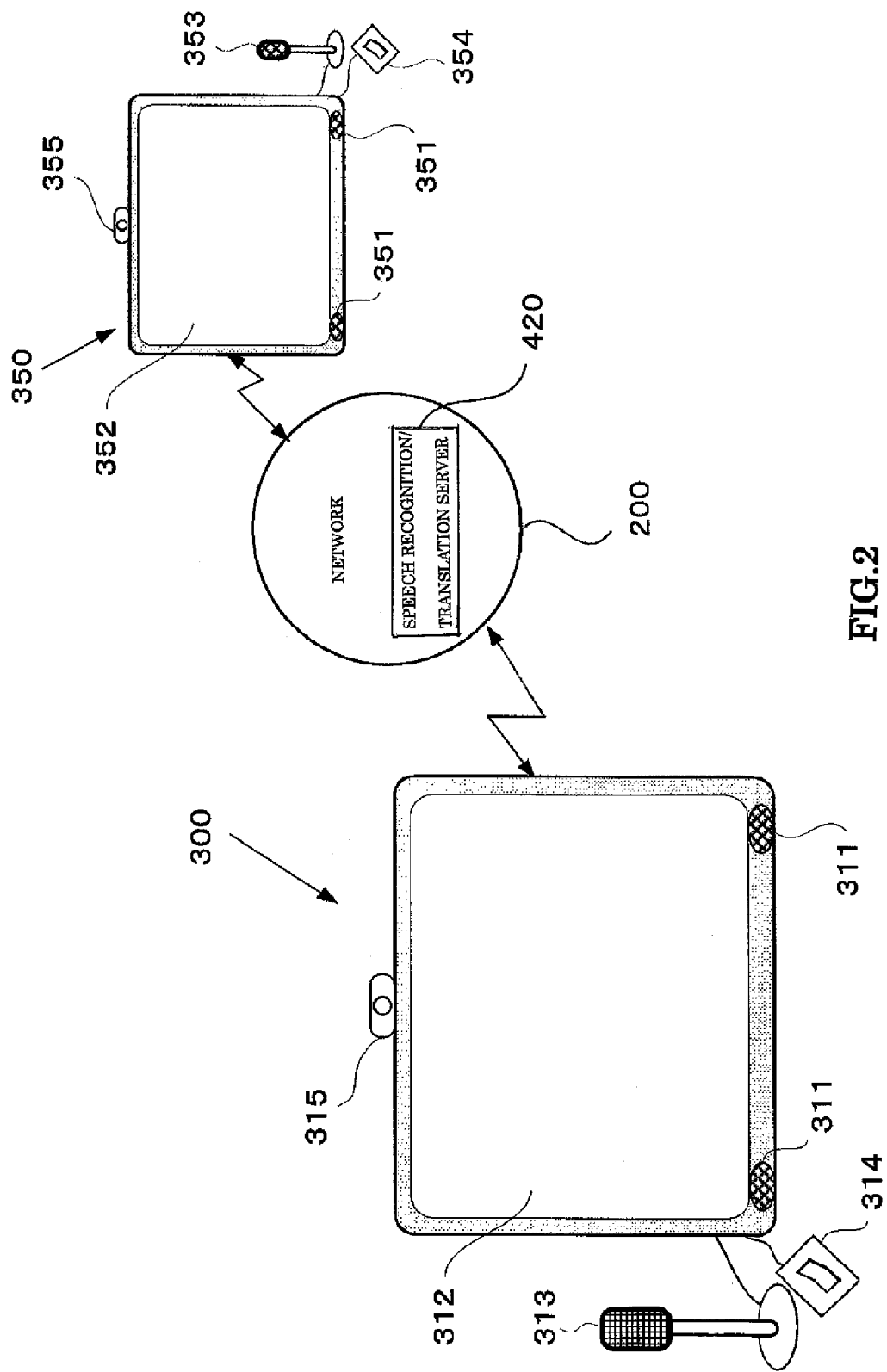
FIG. 2 is another example of hardware component of the speech translation apparatus.

FIG. 2 is another example of a speech translation apparatus according to various embodiments. A user terminal A (300) is a first speech processing device. The user terminal A (300) is a personal computer including a speaker 311, a display 312, a microphone 313, a speech input button 314, and a camera 315. In the same way, a user terminal B (350) is a second speech processing device. The user terminal B (350) is a personal computer including a speaker 351, a display 352, a microphone 353, a speech input button 354, and a camera 355. Function of each device is same as FIG. 1. The cameras 315 and 355 capture an image of the upper half of the body centering the user's face. In the same way as FIG. 1, the user terminal A (300) and the user terminal B (350) are connected via the speech recognition/translation server 420 on the network 200, and the speech translation system is provided. The network 200 may be wireless communication or wired communication. This example is equivalent to hardware component of a television conference system.

The First Embodiment

Figure 3:
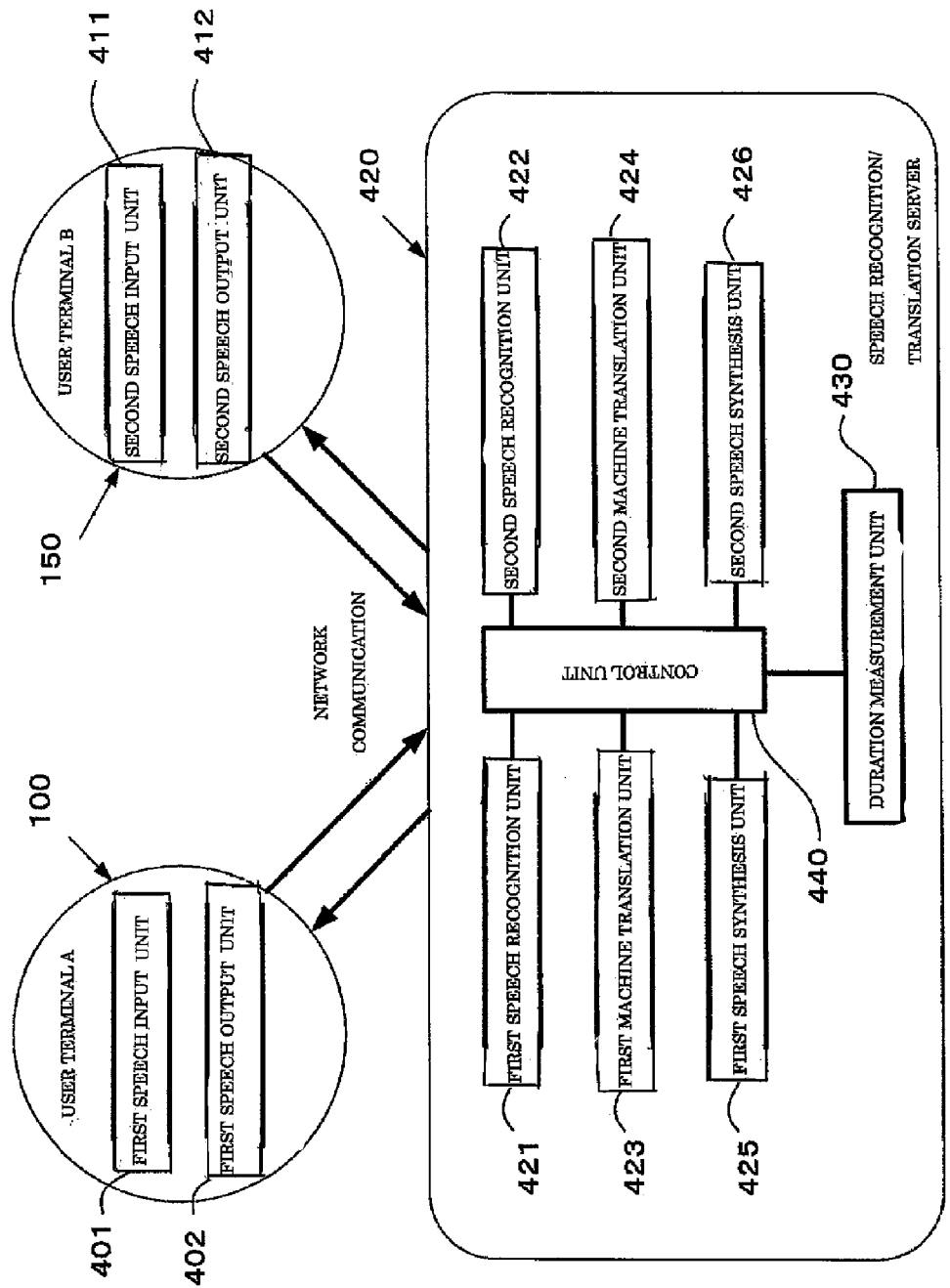
FIG. 3 is a block diagram of the speech translation apparatus according to a first embodiment.

FIG. 3 is a block diagram of a principal component of the speech translation apparatus according to the first embodiment.

In the block diagram of FIG. 3, the component example of FIG. 1 is shown. However, the component example of FIG. 2 may be applied. In order for users A and B (remotely located) to converse bi-directionally, the user terminal A (100) includes a first speech input unit 401 and a first speech output unit 402. In the same way, the user terminal B (150) includes a second speech input unit 411 and a second speech output unit 412. The first speech input unit 401 of the user terminal A (100) is equivalent to the microphone 113 in FIG. 1, and the first speech output unit 402 is equivalent to the speaker 111 in FIG. 1. The second speech input unit 411 of the user terminal B (150) is equivalent to the microphone 153 in FIG. 1, and the second speech output unit 412 is equivalent to the speaker 151 in FIG. 1.

The speech recognition/translation server 420 (set on the network between both terminals) includes a first speech recognition unit 421, a second speech recognition unit 422, a first machine translation unit 423, a second machine translation unit 424, a first speech synthesis unit 425, a second speech synthesis unit 426, a duration measurement unit 430, and a control unit 440.

The first speech recognition unit 421 receives and captures a speech of the first language (For example, Japanese) sent from the first speech input unit 401 of the user terminal A (100). The second speech recognition unit 422 receives and captures a speech of the second language (For example, English) sent from the second speech input unit 411 of the user terminal B (150). By referring to a translation dictionary (not shown in Fig.), the first machine translation unit 423 translates a speech recognition result of the first language (recognized by the first speech recognition unit 421) into the second language, and outputs the translation result to the second speech synthesis unit 426. Furthermore, in order to back translate, the first machine translation unit 423 outputs the translation result of the second language to the second machine translation unit 424. By referring to a translation dictionary (not shown in Fig.), the second machine translation unit 424 translates a speech recognition result of the second language (recognized by the second speech recognition unit 422) into the first language, and outputs the translation result to the first speech synthesis unit 425. Furthermore, in order to back translate, the second machine translation unit 424 outputs the translation result of the first language to the first machine translation unit 423.

The first speech synthesis unit 425 generates a speech synthesis signal (the first language) of the translation result or the back translation result inputted from the second machine translation unit 424, and outputs the speech synthesis signal to the first speech output device 402 of the user terminal A (100). The second speech synthesis unit 426 generates a speech synthesis signal (the second language) of the translation result or the back translation result inputted from the first machine translation unit 423, and outputs the speech synthesis signal to the second speech output device 412 of the user terminal B (150). The duration measurement unit 430 measures a duration of the speech synthesis signal of the first language (outputted from the first speech synthesis unit 425) or a duration of the speech synthesis signal of the second language (outputted from the second speech synthesis unit 426). The control unit 440 controls operation timing of these all units. Moreover, in the speech translation apparatus, the user terminal A (100), the user terminal B (150), and the speech recognition/translation server 420, respectively equip a communication device (not shown in Fig) for network communication.

Next, operation of the speech translation apparatus shown in FIG. 3 will be explained.

In FIG. 3, when a user A utters with the first language (For example, Japanese) via the user terminal A (100), the first speech input unit 401 captures a speech uttered by the user A. The captured speech is sent to the speech recognition/translation server 420 on the network. In following explanation, in order to simplify, explanation of communication between the user terminal A (100) and the speech recognition/translation server 420, and explanation of communication between the user terminal B (150) and the speech recognition/translation server 420, are omitted.

In the speech recognition/translation server 420, the first speech recognition unit 421 inputs the speech of the first language (captured by the first speech input unit 401), and recognizes the speech. This speech recognition result (the first language) is inputted to the first machine translation unit 423. The first machine translation unit 423 inputs the speech recognition result, and executes machine translation from the first language to the second language (For example, English), and outputs this translation result to the second speech synthesis unit 426. Furthermore, in order to back translate, the first machine translation unit 423 outputs the translation result (the second language) to the second machine translation unit 424. The second machine translation unit 424 back translates the translation result (the second language) into the original language (the first language), and outputs this back translation result to the first speech synthesis unit 425.

As a result, by inputting the translation result outputted from the first machine translation unit 423, the second speech synthesis unit 426 generates a speech synthesis signal (the second language) hearable for the user B. This speech of the second language is outputted from the second speech output unit 412 of the user terminal B (150). In the same way, by inputting the back translation result outputted from the second machine translation unit 424, the first speech synthesis unit 425 generates a speech synthesis signal (the first language) hearable for the user A. This speech of the first language is outputted from the first speech output unit 402 of the user terminal A (100).

While the speech output is being operated, the duration measurement unit 430 measures a duration of the speech synthesis signal (i.e., speech signal of the translation result) of the second language outputted from the second speech synthesis unit 426. Then, when the first speech synthesis unit 425 generates a speech synthesis signal (i.e., speech signal of the back translation result) of the first language hearable for the user A, based on the measurement result, the first speech synthesis unit 425 generates the speech synthesis signal of the first language so that a duration thereof is equal to a duration of the speech synthesis signal of the second language.

As a result, a speech of the translation result (the second language) outputted from the second speech output unit 412 of the user terminal B (150), and a speech of the back translation result (the first language) outputted from the first speech output unit 402 of the user terminal A (100), are outputted with the same duration.

In above explanation, the duration measurement unit 430 measures a duration of the speech synthesis signal (the second language) outputted from the second speech synthesis unit 426. However, by measuring a duration of the speech synthesis signal (the first language) of the back translation result outputted from the first speech synthesis unit 425, a duration of the speech synthesis signal (the second language) may be adjusted to be equal to the duration of the speech synthesis signal (the first language). Furthermore, by measuring both durations of the speech synthesis signal (the second language) and the speech synthesis signal (the first language), these speech synthesis signals may be adjusted. Briefly, if a duration of the speech synthesis signal (the second language) is used as the standard, the first speech synthesis unit 425 adjusts a duration of the speech synthesis signal (the first language) to be equal to the duration of the speech synthesis signal (the second language). On the other hand, if a duration of the speech synthesis signal (the first language) is used as the standard, the second speech synthesis unit 426 adjusts a duration of the speech synthesis signal (the second language) to be equal to the duration of the speech synthesis signal (the first language).

In the same way, in FIG. 3, when a user B utters with the second language (For example, English) via the user terminal B (150), the second speech input unit 411 captures a speech uttered by the user B. In the speech recognition/translation server 420, the second speech recognition unit 422 inputs the speech of the second language (captured by the second speech input unit 411), and recognizes the speech. This speech recognition result (the second language) is inputted to the second machine translation unit 424. The second machine translation unit 424 inputs the speech recognition result, and executes machine translation from the second language to the first language (For example, Japanese), and outputs this translation result to the first speech synthesis unit 425. Furthermore, in order to back translate, the second machine translation unit 424 outputs the translation result (the first language) to the first machine translation unit 423. The first machine translation unit 423 back translates the translation result (the first language) into the second language, and outputs this back translation result to the second speech synthesis unit 426.

As a result, by inputting the translation result outputted from the second machine translation unit 424, the first speech synthesis unit 425 generates a speech synthesis signal (the first language) hearable for the user A. This speech of the first language is outputted from the first speech output unit 402 of the user terminal A (100). In the same way, by inputting the back translation result outputted from the first machine translation unit 423, the second speech synthesis unit 426 generates a speech synthesis signal (the second language) hearable for the user B. This speech of the second language is outputted from the second speech output unit 412 of the user terminal B (150).

While the speech output is being operated, the duration measurement unit 430 measures a duration of the speech synthesis signal (i.e., speech signal of the translation result) of the first language outputted from the first speech synthesis unit 425. Then, when the second speech synthesis unit 426 generates a speech synthesis signal (i.e., speech signal of the back translation result) of the second language hearable for the user B, based on the measurement result, the second speech synthesis unit 426 generates the speech synthesis signal of the second language so that a duration thereof is equal to a duration of the speech synthesis signal of the first language.

As a result, a speech of the translation result (the first language) outputted from the first speech output unit 402 of the user terminal A (100), and a speech of the back translation result (the second language) outputted from the second speech output unit 412 of the user terminal B (150), are outputted with the same duration.

Figure 4:
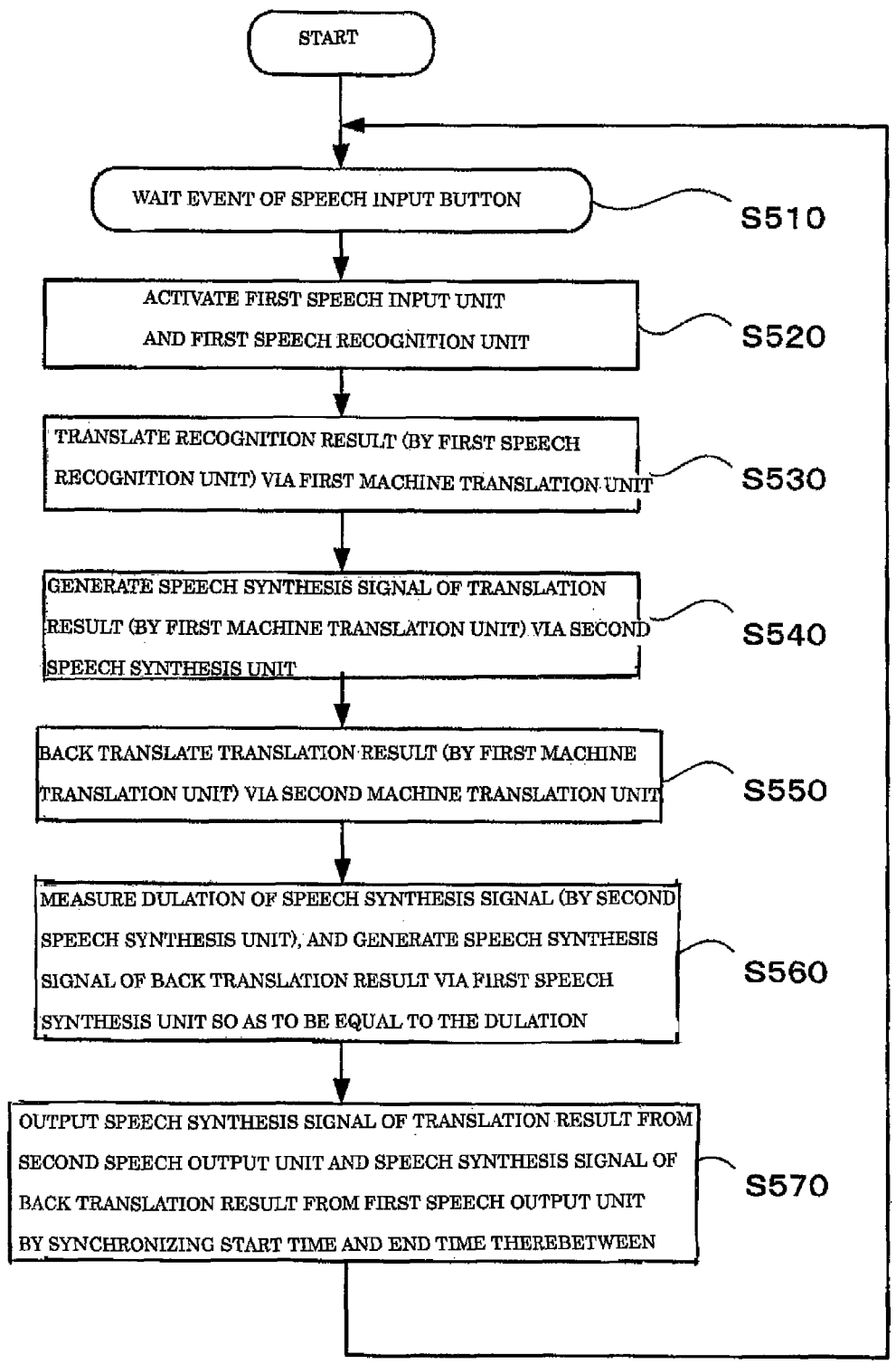
FIG. 4 is a flow chart of processing of the speech translation apparatus according to the first embodiment.

FIG. 4 is a flow chart of processing of the speech translation apparatus shown in FIG. 3. In order to simplify the explanation, in FIG. 4, a speech of the first language (For example, Japanese) of the user A is captured, and this speech is translated into the second language (For example, English) of the user B. In the case of processing the user B's utterance, the same flow chart can be applied.

In FIG. 4, at S510, an operation (event) to push a speech input button 114 of the user terminal A (100) is waited. When the speech input button 114 is pushed, this event is notified to S520. The first speech input device 401 and the first speech recognition unit 421 are activated. At S520, the first speech recognition unit 421 recognizes the user A's utterance captured from the first speech input device 401 (microphone 113). For example, by detecting a silent interval (a period of speech signal having small power continues in a predetermined period (T1)) of the speech, the first speech recognition device 421 fixes the speech recognition result.

At S530, the speech recognition result fixed by the first speech recognition unit 421 is inputted to the first machine translation unit 423. The first machine translation unit 423 translates the speech recognition result from the first language (For example, Japanese) of the user A into the second language (For example, English) of the user B. At S540, the translation result of the second language (For example, English) by the first machine translation unit 423 is inputted to the second speech synthesis unit 426. As a result, the second speech synthesis unit 423 synthesizes a speech of the translation result (by the first machine translation unit 423) to be outputted as the second language.

Next, at S550, the translation result by the first machine translation unit 423 is inputted to the second machine translation device 424. The second machine translation unit 424 back translates the translation result of the second language (For example, English) by the first machine translation unit 423 into the first language (For example, Japanese). The back translation result of the first language (For example, Japanese) by the second machine translation unit 424 is inputted to the first speech synthesis unit 425.

At 560, the duration measurement unit 430 measures a duration of the speech synthesis signal (the second language) acquired at S540. Then, the first speech synthesis unit 425 generates a speech synthesis signal of the back translation result (the first language) acquired at S550 so that a duration thereof is equal to the duration measured by the duration measurement unit 430. Last, at S570, the second speech output unit 412 outputs the speech synthesis signal of the translation result (the second language) acquired at S540, and the first speech output unit 402 outputs the speech synthesis signal of the back translation result (the first language) acquired at S560. Briefly, a duration of a phrase of the second language outputted from the second speech output unit 412 is equal to a duration of a phrase of the first language outputted from the first speech output unit 402. When processing of S570 is completed, processing is returned to S510, and next event is waited.

Figure 5:
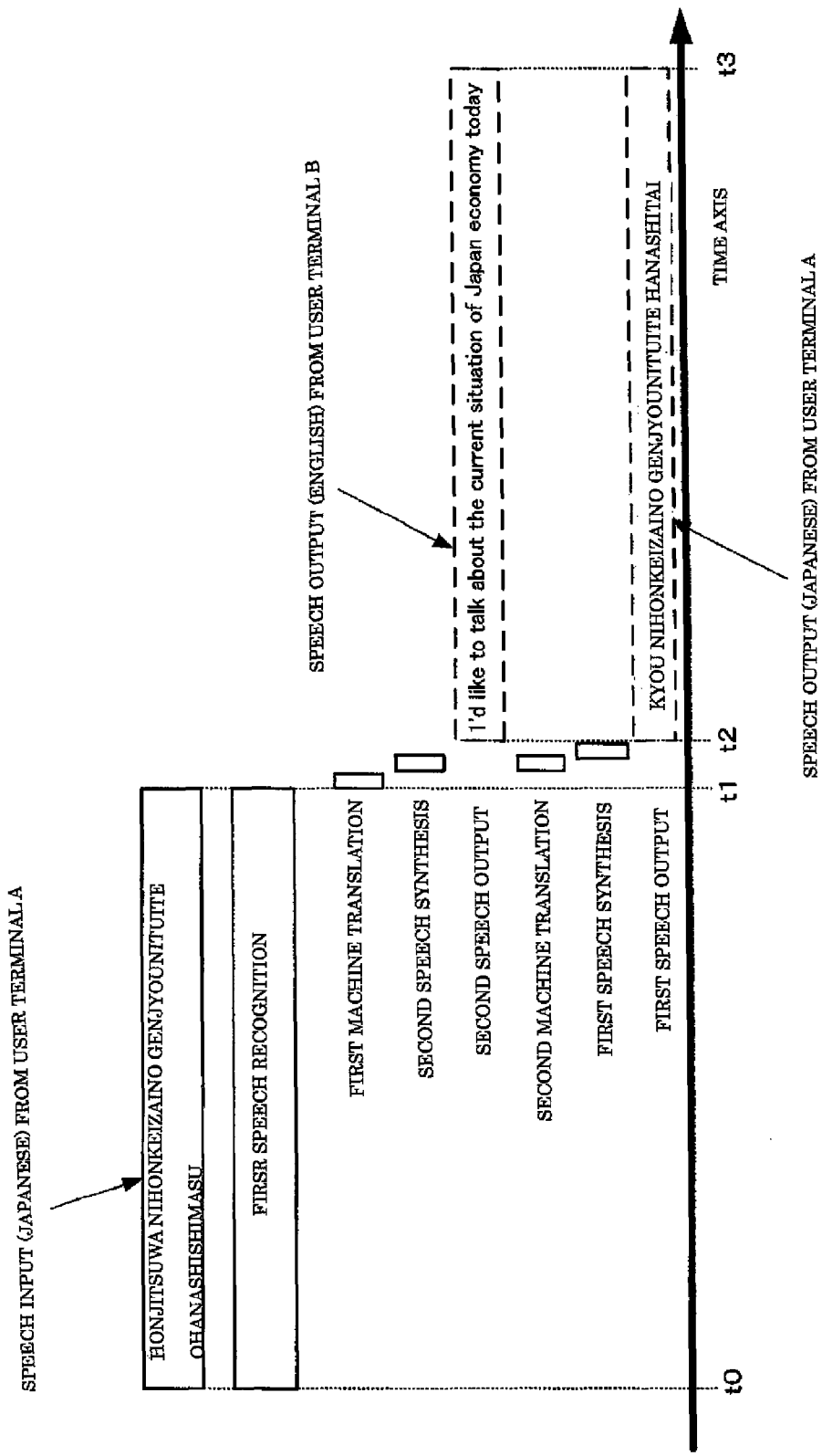
FIG. 5 is a time relationship between speech input and speech output according to the first embodiment.

FIG. 5 shows a time relationship between a speech of the translation result (the second language) outputted from the second speech output unit 412 and a speech of the back translation result (the first language) outputted from the first speech output unit 402, as to the user A's utterance (the first language) according to the first embodiment.

The first speech input unit 401 captures the user A's utterance "HONJITSUWA NIHONKEIZAINO GENJYOUNITSUITE OHANASHISHIMASU" (Japanese). At the same time, the first speech recognition unit 421 recognizes this utterance. After that, by processing of S530~S560 in FIG. 4, as a machine translation result of the speech recognition result acquired by the first speech recognition unit 421, a speech synthesis signal "I'd like to talk about the current situation of Japan economy today" (English) is generated. Furthermore, as a back translation result of the translation result, a speech synthesis signal "KYOU NIHONKEIZAINO GENJYOUNITSUITE HANASHITAI" (Japanese), is generated. These two speech synthesis signals are generated with the same duration.

Accordingly, a speech of the translation result outputted from the second speech output unit 412 (speaker 151) of the user terminal B, and a speech of the back translation result outputted from the first speech output unit 402 (speaker 111) of the user terminal A, are outputted synchronously. Briefly, each synthesized speech is outputted at the same time. In FIG. 5, an output start time t2 and an output end time t3 therebetween are matched respectively.

Figure 6:
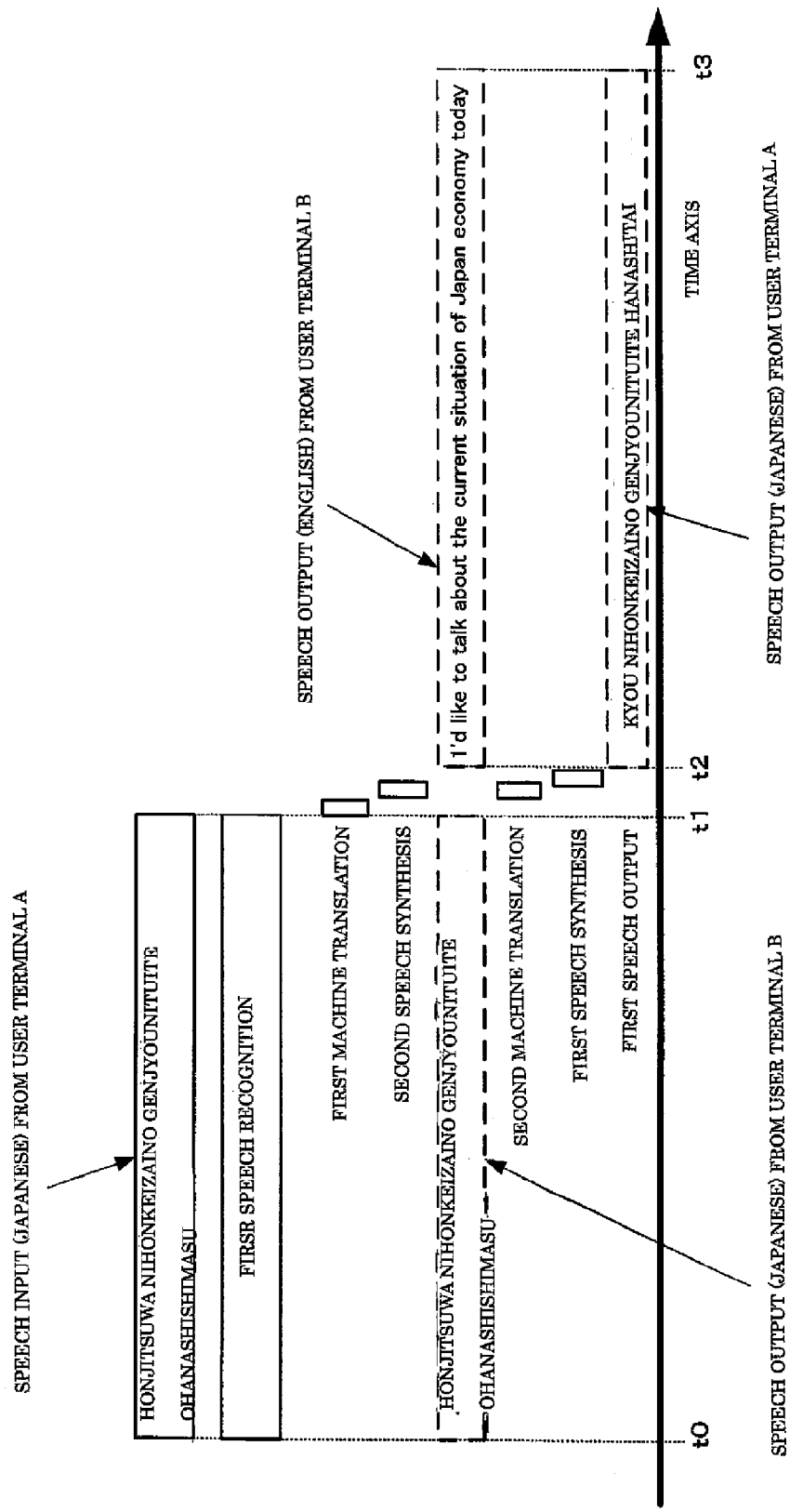
FIG. 6 is a time relationship (having speech output of original language speech) between speech input and speech output according to the first embodiment.

Moreover, as shown in FIG. 6, while the first speech input unit 401 is capturing the user A's speech (Japanese), the second speech output unit 412 may output the user A's speech (Japanese). As a result, the user B can confirm that the user A is uttering.

The Second Embodiment

In the first embodiment, processing is executed by synchronizing the first speech recognition unit 421, the second speech recognition unit 422, the first machine translation unit 423, the second machine translation unit 424, the first speech synthesis unit 425 and the second speech synthesis unit 426, in order. However, in the second embodiment, by operating these units in parallel, processing can be executed asynchronously. In following explanation, hardware components of FIGS. 1 and 3 are referred.

Figure 7A:
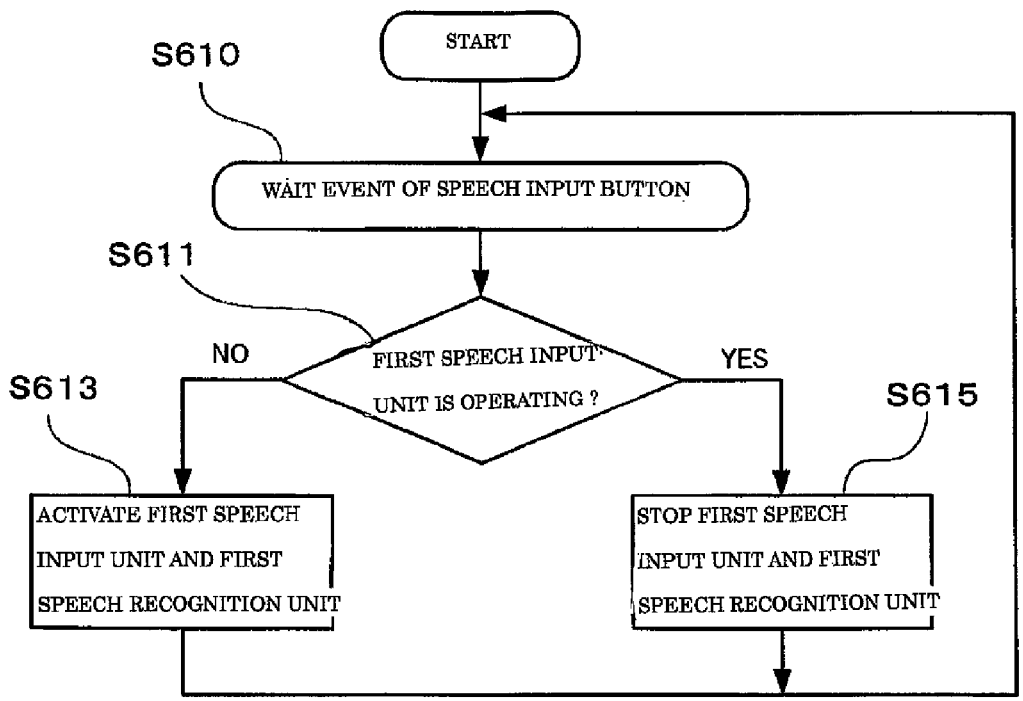
FIGS. 7A, 7B and 7C are flow charts of first processing, second processing, and third processing of the speech translation apparatus according to a second embodiment.
Figure 7B:
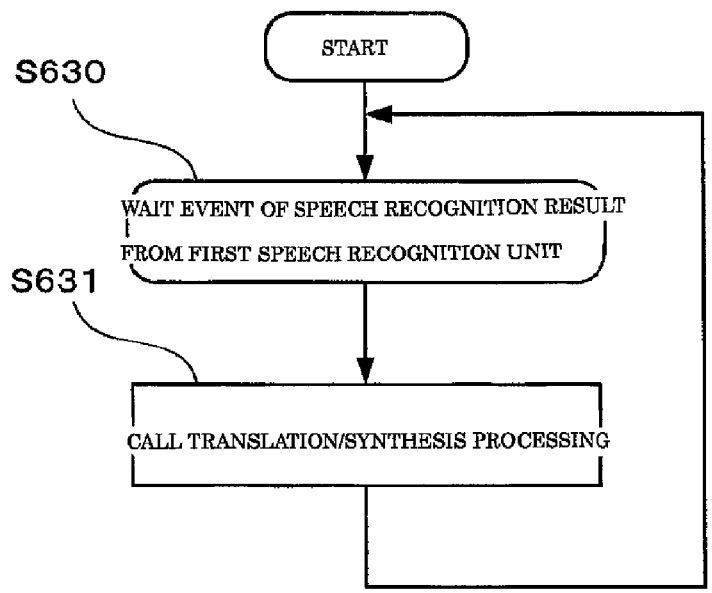
Figure 7C:
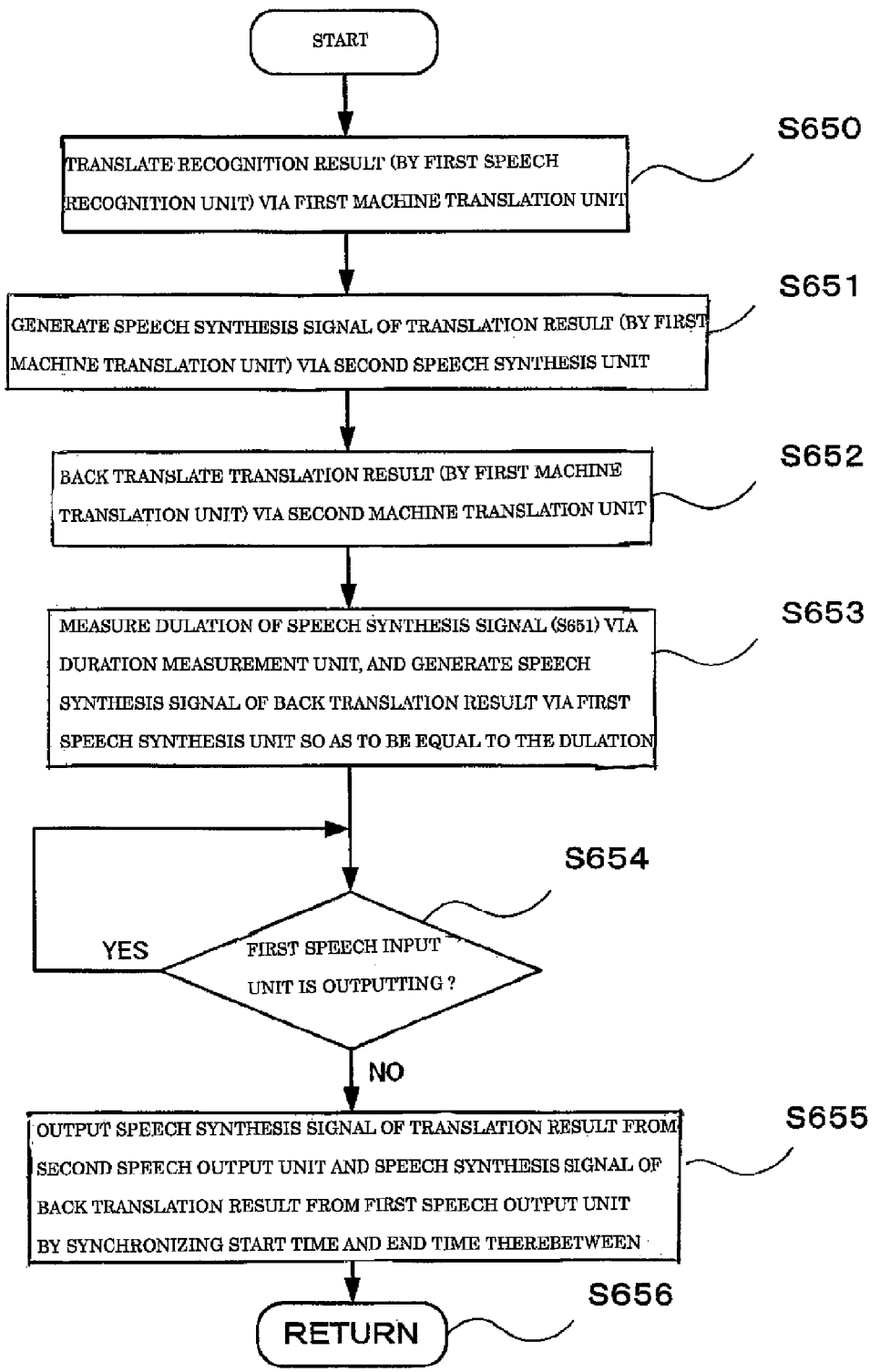

FIGS. 7A~7C are flow charts of operation of the second embodiment. Briefly, they are flow charts in case of operating the first speech recognition unit 421, the second speech recognition unit 422, the first machine translation unit 423, the second machine translation unit 424, the first speech synthesis unit 425 and the second speech synthesis unit 426, in parallel.

First, by pushing a speech input button 114 of the user terminal A (100), processing of flow chart of FIG. 7A is started. Briefly, at S610, occurrence of event (ON operation) to detect push of the speech input button 114 is waited. Then, when the speech input button 114 is pushed, processing is forwarded to S611. At S611, it is checked whether the first speech input unit 401 is operating. If not so, at S613, the first speech input unit 401 and the first speech recognition unit 421 are activated. If the first speech input unit 401 is operating at S611, by OFF operation of the speech input button 114, at S615, the first speech input unit 401 and the first speech recognition unit 421 are stopped.

As a result, by operation of the speech input button 114, ON/OFF of speech input from the user terminal A (100) is controlled. The first speech recognition unit 421 recognizes a speech orderly captured by the first speech input unit 401. Then, when a silent interval of the speech is detected, the first speech recognition unit 421 fixes a recognition result of the speech already inputted, and outputs the recognition result to the first machine translation unit 423.

FIG. 7B is a flow chart of operation of the first machine translation unit 423. At S630, the first machine translation unit 423 waits occurrence of event to input a speech recognition result from the first speech recognition unit 421. Then, when the speech recognition result is received from the first speech recognition unit 421, the first machine translation unit 423 calls translation/synthesis processing at S631, and waits next event at S630.

FIG. 7C is a flow chart to execute translation/synthesis processing called at S631. First, at S650, the speech recognition result of the first speech recognition unit 423 is inputted to the first machine translation unit 423, and a translation result that the speech recognition result is translated into the second language of the user B is obtained from the first machine translation unit 423. Furthermore, at S651, the translation result (obtained at S650) is inputted to the second speech synthesis unit 426, and a speech synthesis signal of the second language is obtained from the second speech synthesis unit 426. Furthermore, at S652, the translation result (obtained at S650) is inputted to the second machine translation unit 424, and a back translation result is obtained from the second machine translation unit 424.

Next, at S653, the duration measurement unit 430 measures a duration of the speech synthesis signal outputted from the second speech synthesis unit 426. The first speech synthesis unit 425 generates a speech synthesis signal of the back translation result outputted from the second machine translation unit 424 so that a duration thereof is equal to the duration measured by the duration measurement unit 430. Then, at S654, it is decided whether the first speech output unit 402 is outputting the speech. If not so, at S655, the second speech output unit 412 outputs a speech of the translation result. At the same time, the first speech output unit 402 outputs a speech of the back translation result.

Figure 8:
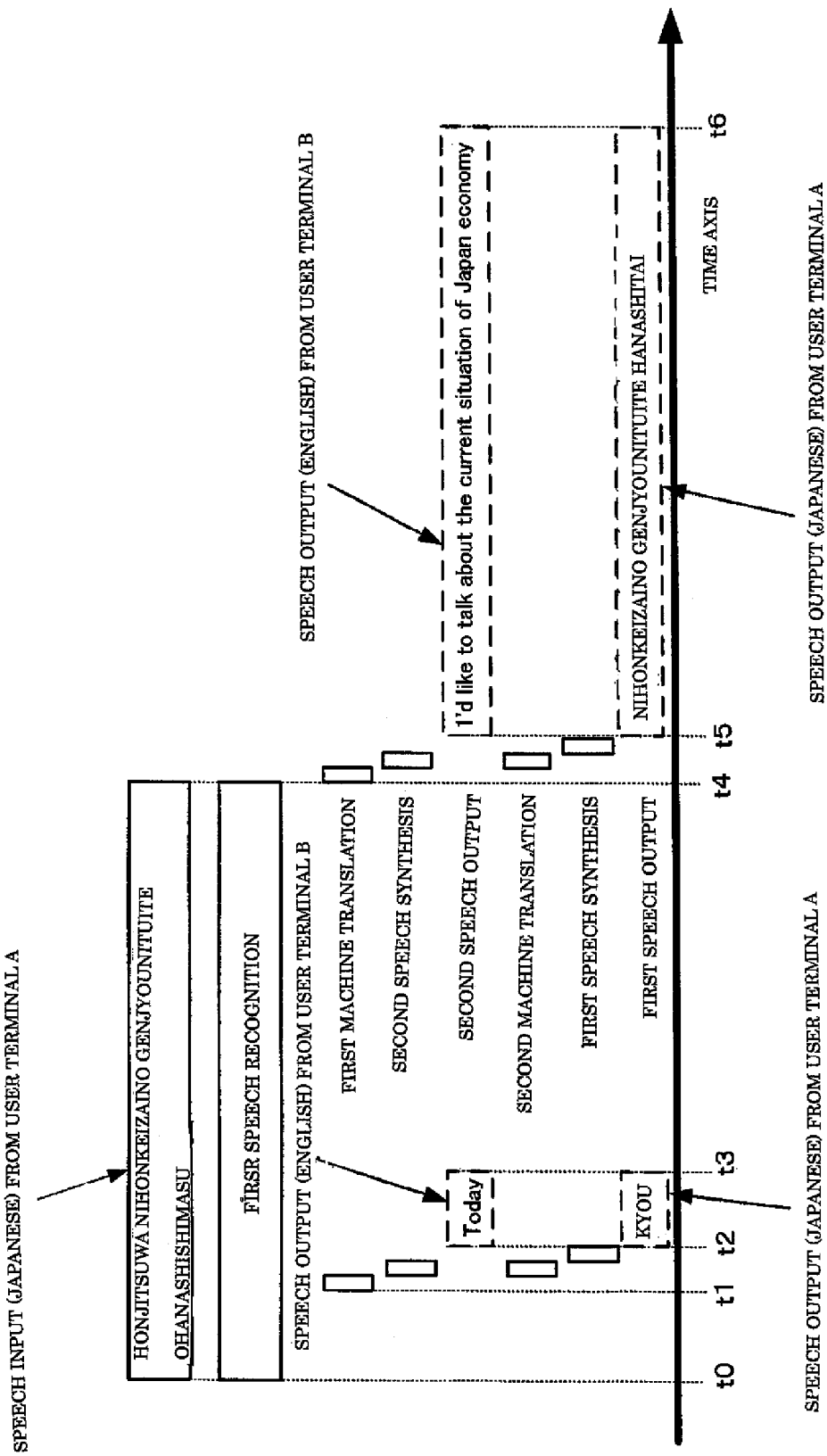
FIG. 8 is a time relationship between speech input and speech output according to the second embodiment.

FIG. 8 shows time relationship among utterance from the user terminal A (100), speech output of the translation result from the second speech output unit 412, and speech output of the back translation result from the first speech output unit 402, based on flow chart of FIGS. 7A~7C.

In FIG. 8, the user A's utterance "HONJITSUWA NIHONKEIZAINO GENJYOUNITSUITE OHANASHISHIMASU" (Japanese) is inputted from the first speech input unit 401 of the user terminal A (100). Assume that a silent interval over (t2-t1) exists after an end time t1 of "HONJITSUWA". Here, by detecting the silent interval, the first speech recognition unit 421 decides that the speech recognition result (already obtained) can be outputted, and sends an event to S610. At S610, the event is received, and translation/synthesis processing is called.

At S650~S657, as to the speech recognition result corresponding to "HONJITSUWA", a speech synthesis signal of "Today" (English) as the translation result and a speech synthesis signal of "KYOU" (Japanese) as the back translation result are generated. Then, at S655, these speech synthesis signals are outputted as speech (output start time t2~output end time t3).

In the same way, just after an utterance "NIHONKEIZAINO GENJYOUNITSUITE OHANASHISHIMASU" (Japanese) following "HONJITSUWA" is inputted from the user terminal A (100), a silent interval is detected. As to the translation result "I'd like to talk about the current situation of Japan economy" (English) and the back translation result "NIHONKEIZAINO GENJYOUNITSUITE HANASHITAI" (Japanese), speech synthesis signals thereof are outputted at the same time (output start time t5 output end time t6) in FIG. 8.

The Third Embodiment

Figure 9:
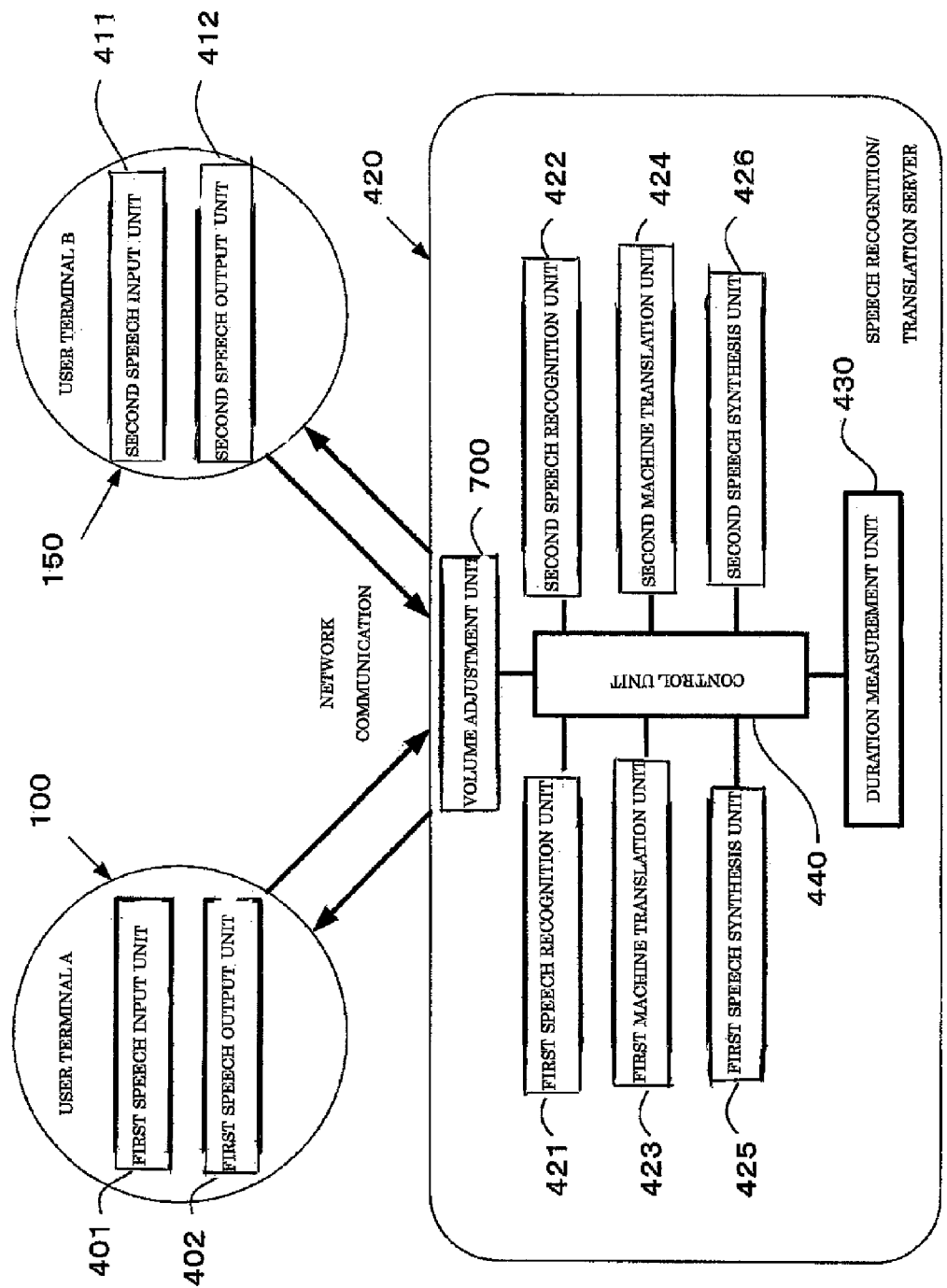
FIG. 9 is a block diagram of the speech translation apparatus according to a third embodiment.

FIG. 9 is a block diagram of the speech translation apparatus according to the third embodiment. In the third embodiment, in comparison with the first embodiment, a volume adjustment unit 700 is differently equipped. The volume adjustment unit 700 can adjust a volume of speech outputted from the first speech output unit 402 and the second speech output unit 412.

Figure 10:
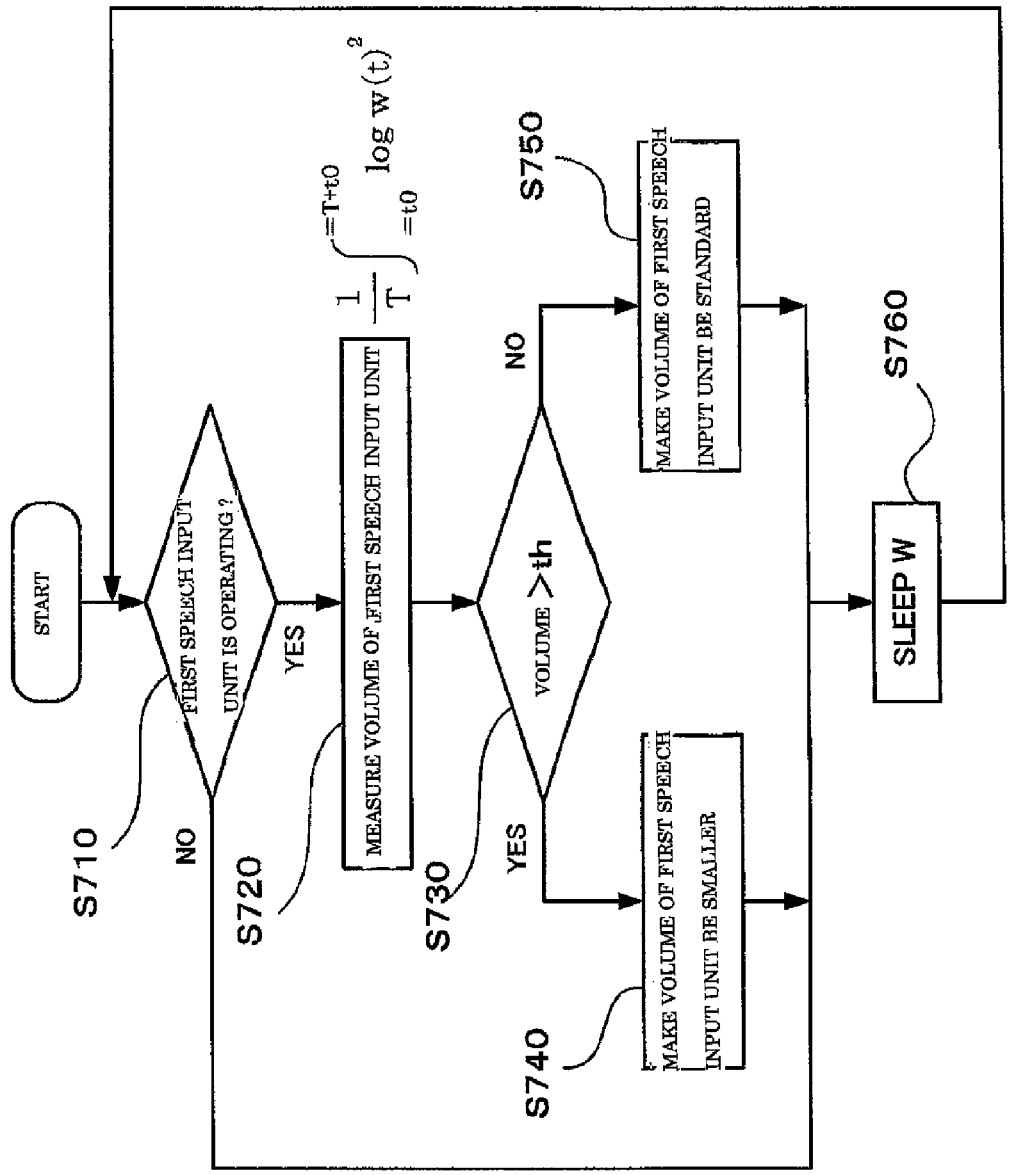
FIG. 10 is a flow chart of processing of volume-adjustment according to the third embodiment.

FIG. 10 is a flow chart of control processing by the volume adjustment unit 700. In order to simplify the explanation, in FIG. 10, a flow chart to adjust a volume of the first speech output unit 402 is only shown. A volume of the second speech output unit 412 can be adjusted by the same flow chart.

First, at S710, the volume adjustment unit 700 confirms whether the first speech input unit 401 is operating. If the first speech input unit 401 is operating, at S720, the volume adjustment unit 700 measures a volume of the first speech input unit 401. Next, at S730, the volume adjustment unit 700 decides whether the volume is above a predetermined threshold "th". If the volume is above the threshold "th", at S740, the volume adjustment unit 700 lowers the volume of speech (outputted from the first speech output unit 402) than the standard. On the other hand, if the volume is not above the threshold "th", at S750, the volume adjustment unit 700 sets the volume of speech (outputted from the first speech output unit 402) to the standard. Then, after the volume adjustment unit 700 pauses in time W (previously determined at S760), at S710, the volume adjustment unit 700 repeats speech processing for next translation.

By control of the volume adjustment unit 700, speech can be outputted with the volume easy for the users A and B to listen. Specifically, while the first speech input unit 401 is capturing a speech, if the speech has a specific volume (large), it is decided that the user A is uttering and a volume of the first volume output unit 401 is lowered than the standard. On the other hand, if the speech (captured by the first speech input unit 401) does not have the specific volume (small) or silent, it is decided that the user A is not uttering and the volume of the first volume output unit 401 is set to the standard.

Furthermore, in volume-adjustment by the volume adjustment unit 700, after translating the user A's utterance, when the back translation result is outputted to feedback to the user A by speech, if the user A does not finish to utter yet, the volume is lowered.

Figure 11:
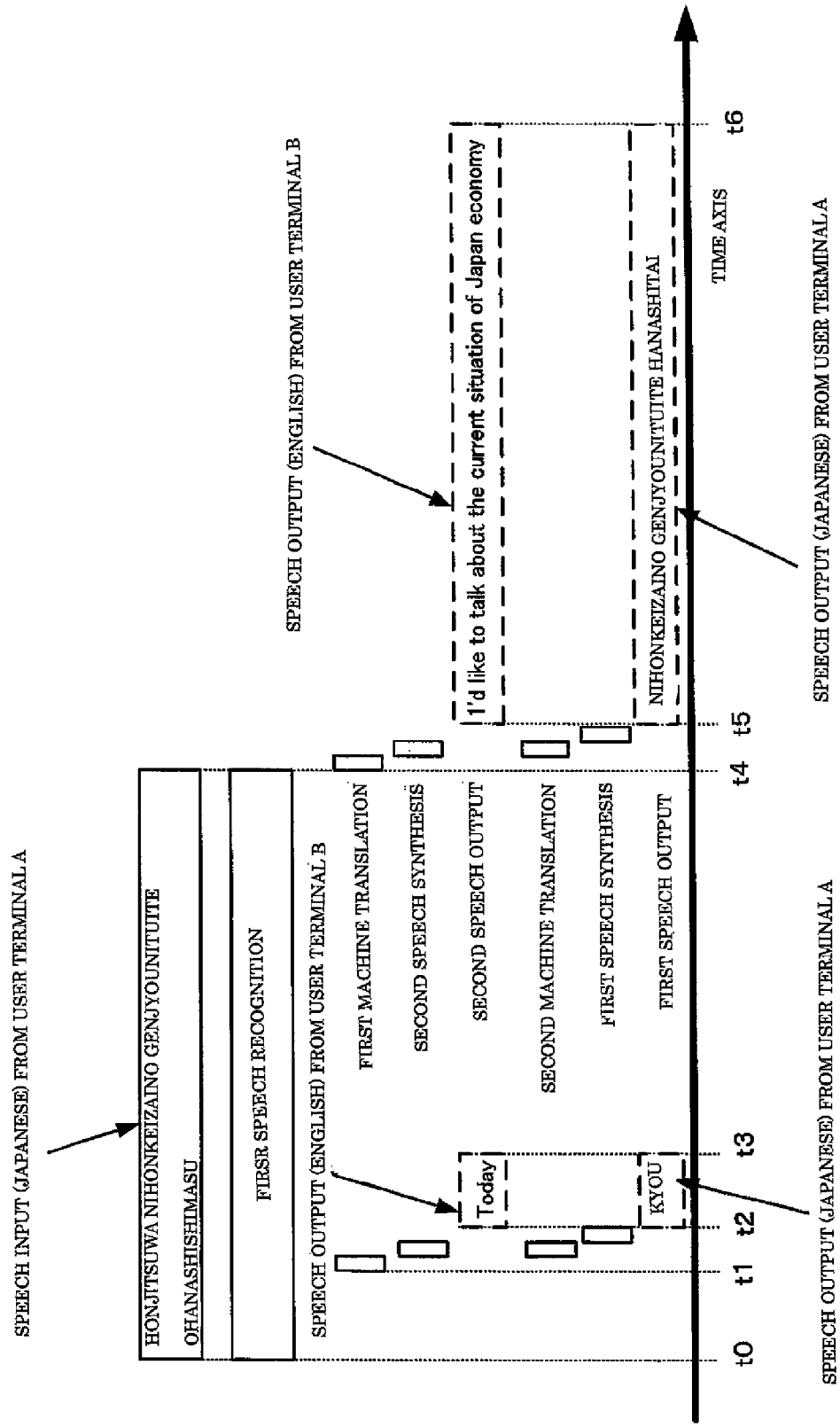
FIG. 11 is a time relationship (having speech output of original language speech) between speech input and speech output according to the third embodiment.

Briefly, in a period between time t2 and time t3 of FIG. 11, the first speech input unit 401 captures the user A's utterance. Accordingly, when the back translation result "KYOU" is outputted from the first speech output apparatus 402, the volume adjustment unit 700 lowers a volume of the speech than the standard. On the other hand, if the user A is not uttering (i.e., silent status), the volume adjustment unit 700 sets the volume to the standard. In FIG. 11, in a period between time t5 and time t6 of FIG. 11, the first speech input unit 401 does not input a speech. Accordingly, the volume adjustment unit 700 sets a volume of a synthesized speech of the back translation result "NIHONKEIZAINO GENJY-OUNITSUITE HANASHITAI" (from the first speech output unit 402) to the standard.

During the user A's uttering, if the back translation result is outputted to feedback to the user A with large volume, the user A is confused. However, as mentioned-above, during utterance, by outputting the back translation result to feedback with small volume, the confusion can be avoided. Furthermore, feedback-output of the back translation result, continuous-input of utterance, synchronization between speech output to the other party and speech output of the back translation result, can be realized.

The Fourth Embodiment

Figure 12:
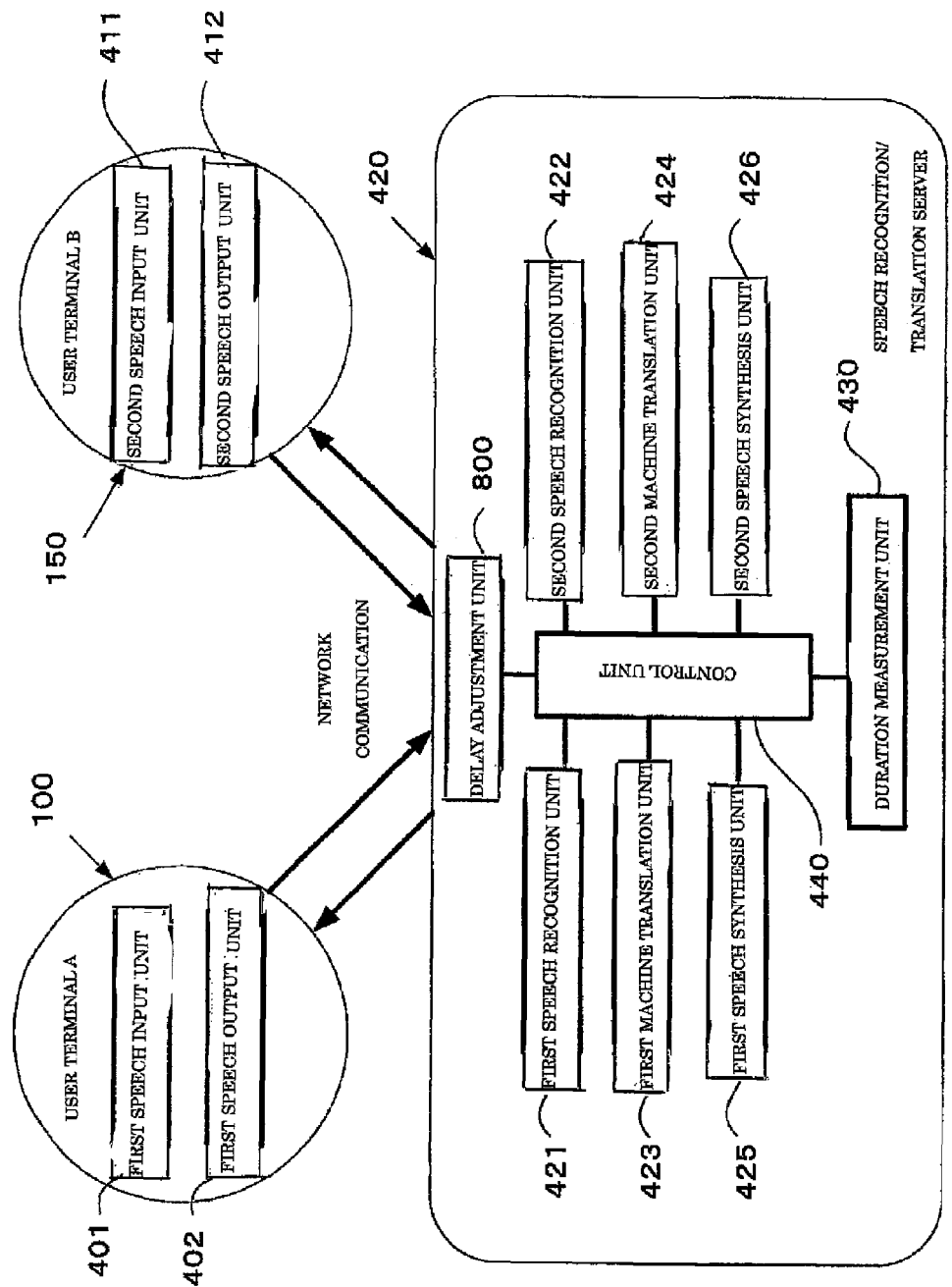
FIG. 12 is a block diagram of the speech translation apparatus according to a fourth embodiment.

FIG. 12 is a block diagram of the speech translation apparatus according to the fourth embodiment. In the fourth embodiment, based on a reliability of the speech translation result, speech output of the translation result and speech output of the back translation result are delayed. In comparison with the first embodiment, a delay adjustment unit 800 is equipped.

The delay adjustment unit 800 delays speech output, based on a reliability of the speech translation result from the first machine translation unit 423 or the second machine translation unit 424. Briefly, if the reliability is low, the first speech output unit 402 is controlled so that a start time of speech output of the back translation result is set after the user A's utterance is completed.

Figure 13:
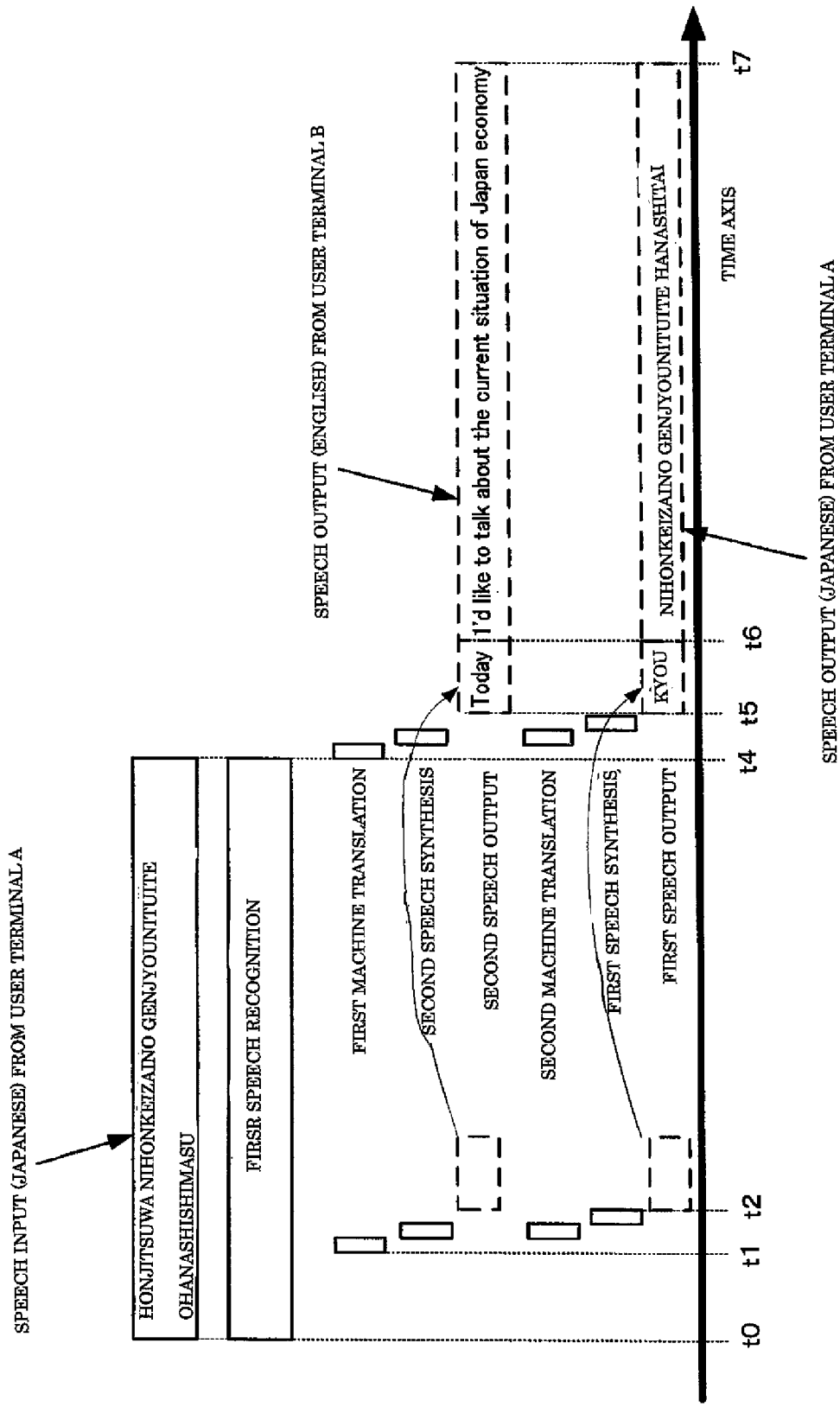
FIG. 13 is a time relationship between speech input and speech output according to the fourth embodiment.
Figure 14:
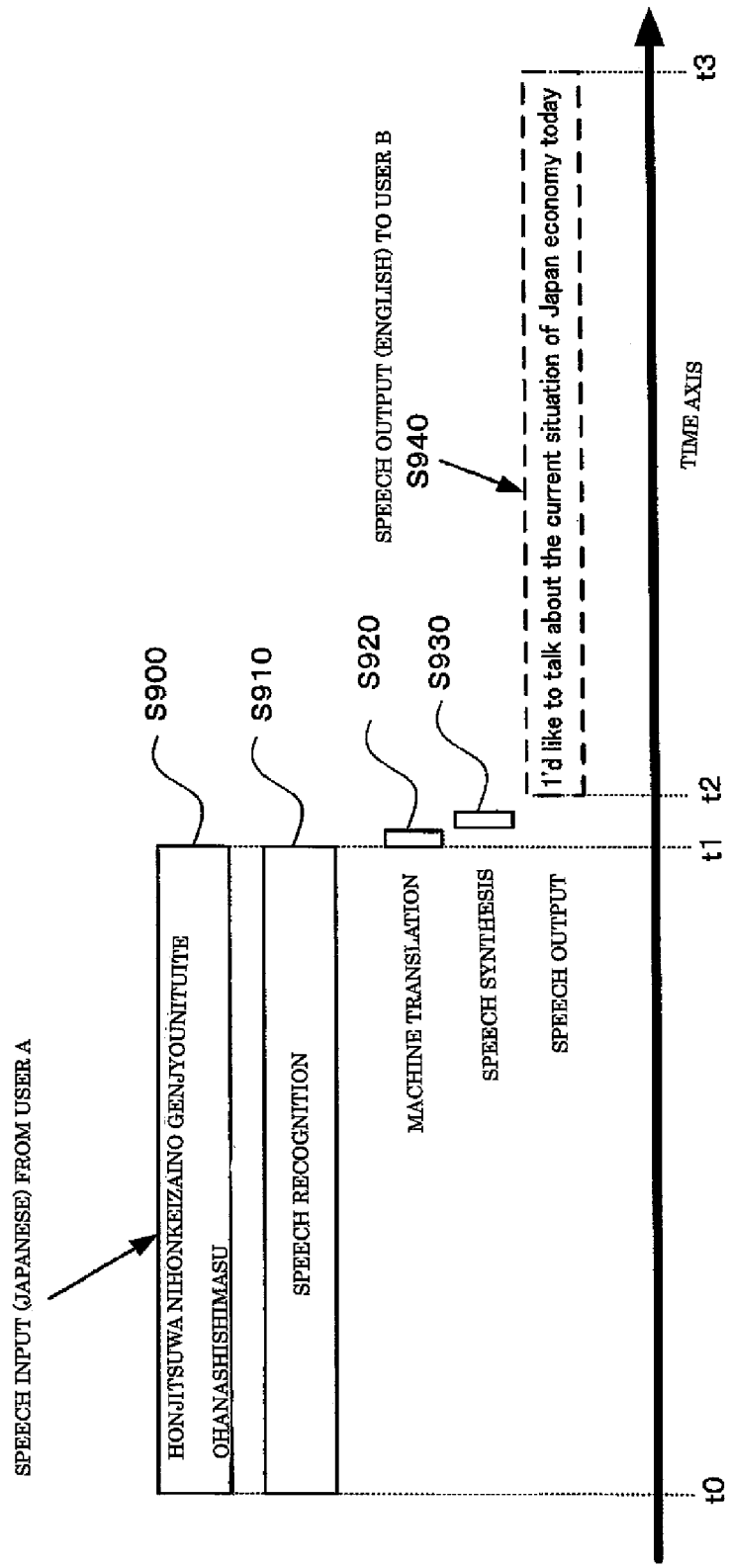
FIG. 14 is a time relationship between speech input and speech output according to a speech translation system of conventional technique.

FIG. 13 shows time relationship between speech input and speech output according to the fourth embodiment. Here, based on a translation result by the first machine translation unit 423 and a back translation result by the second machine translation unit 424, a delay time to output a speech from the first speech output unit 402 is set.

In the second embodiment, as mentioned-above, from time t2 in FIG. 8, a speech of the back translation result is outputted via the first speech output unit 402. On the other hand, in the fourth embodiment, when a silent interval after utterance "HONJITSUWA" is short, if the delay adjustment unit 800 decides that a reliability of the translation result by the first machine translation unit 423 is low, the delay adjustment unit 800 prohibits speech output from the first speech output unit 402 in a period between time t2 and time t5, and controls the first speech output unit 402 to output speech after time t5. Moreover, speech output of the translation result from the second speech output unit 412 may be delayed to time t5 in synchronization with output of the first speech output unit 402.

Briefly, the user A starts to hear the back translation result at time t5 after the utterance is completed. Accordingly, the user A recognizes that the reliability of the translation result by the first machine translation unit 423 or by the second machine translation unit 424 is low, and the user A can intelligibly speak in following utterance. As a result, conversation between two users via the speech translation apparatus can be smoothly performed.

As mentioned-above, according to the speech translation apparatus of the first~fourth embodiments, when a synthesized speech of a translation result of the user A's utterance is generated and outputted to the user B, a synthesized speech of a back translation result of the translation result is generated so that a duration of the synthesized speech of the back translation result is equal to a duration of the synthesized speech of the translation result. Accordingly, in synchronization with output of speech (the translation result) to the user B, speech (the back translation result) can be outputted to the user A. As a result, collision of utterance between the user A and the user B can be avoided. Furthermore, the user A can simultaneously confirm whether content of the user A's utterance is correctly translated for the user B.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operating system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for translating speech, the apparatus comprising:
   a first device including first circuitry configured to capture a first speech of a first language, and to output a second speech of the first language;

a second device including second circuitry configured to output a third speech of a second language; and
a server to execute speech-translation between the first device and the second device;
the server comprising:
third circuitry configured to
recognize the first speech of the first language sent from the first circuitry,
translate a speech recognition result of the first speech into the second language,
back translate a translation result of the second language into the first language,
generate a first speech synthesis signal of a back translation result of the first language,
send the first speech synthesis signal to the first circuitry to output the second speech of the first language,
generate a second speech synthesis signal of the translation result,
send the second speech synthesis signal to the second circuitry to output the third speech of the second language, and
measure a duration of the second speech synthesis signal or a duration of the first speech synthesis signal;
wherein the second speech of the first language and the third speech of the second language are outputted by synchronizing a start time and an end time of the second speech of the first language with a start time and an end time of the third speech of the second language respectively, based on the duration.

2. The apparatus according to claim 1, wherein,
if the duration of the second speech synthesis signal is used as a standard,
the third circuitry sets a duration of the first speech synthesis signal to the duration of the second synthesis signal.

3. The apparatus according to claim 1, wherein,
if the duration of the first speech synthesis signal is used as a standard,
the third circuitry sets a duration of the second speech synthesis signal to the duration of the first synthesis signal.

4. The apparatus according to claim 1,
wherein the third circuitry,
if a volume of the first speech inputted to the first circuitry is larger than a predetermined threshold, lowers a volume of the second speech of the first language outputted from the first circuitry, and,
if the volume of the first speech inputted to the first circuitry is not larger than the predetermined threshold, sets the volume of the second speech of the first language to a normal level.

5. The apparatus according to claim 1,
wherein the third circuitry delays the start time of the second speech of the first language outputted from the first circuitry, based on at least one of a reliability of the speech recognition result, a reliability of the translation result, and a reliability of the back translation result.

6. A non-transitory computer readable medium for causing a computer to perform operations in a server,
the server being configured to execute speech-translation between a first device and a second device;
the operations comprising:
recognizing a first speech of a first language sent from the first device;
translating a speech recognition result of the first language by the recognizing into a second language;
back translating a translation result of the second language by the translating into the first language;
generating a first speech synthesis signal of a back translation result by the back translating;
sending the first speech synthesis signal to the first device to output a second speech of the first language;
generating a second speech synthesis signal of the translation result;
sending the second speech synthesis signal to the second device to output a third speech of the second language;
measuring a duration of the second speech synthesis signal or a duration of the first speech synthesis signal; and
outputting the second speech of the first language and the third speech of the second language by synchronizing a start time and an end time of the second speech of the first language with a start time and an end time of the third speech of the second language respectively, based on the duration.

7. An apparatus for translating speech, the apparatus comprising:
a memory configured to store instructions; and
processing circuitry coupled with the memory;
the processing circuitry being configured to
capture a first speech of a first language,
recognize the first speech,
translate a speech recognition result of the first speech into the second language,
back translate a translation result of the second language into the first language,
generate a first speech synthesis signal of a back translation result of the first language,
generate a second speech synthesis signal of the translation result,
measure a duration of the second speech synthesis signal or a duration of the first speech synthesis signal, and
output the first speech synthesis signal and the second speech synthesis signal by synchronizing a start time and an end time of the first speech synthesis signal with a start time and an end time of the second speech synthesis signal respectively, based on the duration.

8. The apparatus according to claim 7, wherein,
if the duration of the second speech synthesis signal is used as a standard,
the processing circuitry sets a duration of the first speech synthesis signal to the duration of the second synthesis signal.

9. The apparatus according to claim 7, wherein,
if the duration of the first speech synthesis signal is used as a standard,
the processing circuitry sets a duration of the second speech synthesis signal to the duration of the first synthesis signal.

10. The apparatus according to claim 7,
wherein the processing circuitry,
if a volume of the first speech is larger than a predetermined threshold, lowers a volume of a second speech of the first language to be outputted from the first speech synthesis signal, and,
if the volume of the first speech is not larger than the predetermined threshold, sets the volume of the second speech to a normal level.

11. The apparatus according to claim 7,
wherein the processing circuitry delays the start time of the first speech synthesis signal, based on at least one of a reliability of the speech recognition result, a reliability of the translation result, and a reliability of the back translation result.

* * * * *